United States Patent [19]
Amuro et al.

[11] Patent Number: 6,076,102
[45] Date of Patent: *Jun. 13, 2000

[54] SCSI CONTROLLER WITH TARGET STATUS RETRIEVAL

[75] Inventors: Stephen J. Amuro, Middletown; Paul J. Giorgio, Providence, both of R.I.

[73] Assignee: The United States of America as represented by the Secretary of the Navy, Washington, D.C.

[*] Notice: This patent is subject to a terminal disclaimer.

[21] Appl. No.: 08/219,552

[22] Filed: Mar. 29, 1994

[51] Int. Cl.[7] .............................. G06F 13/38; G06F 15/17

[52] U.S. Cl. ............................................................ 709/217

[58] Field of Search ............................ 395/200, DIG. 1; 364/206; 709/217

[56] References Cited

U.S. PATENT DOCUMENTS

| | | | |
|---|---|---|---|
| 4,783,730 | 11/1988 | Fischer | 364/200 |
| 4,864,532 | 9/1989 | Reeve et al. | 364/900 |
| 5,471,634 | 11/1995 | Giorgio et al. | 395/200.01 |

OTHER PUBLICATIONS

ANSI X3.131–1986, pp. 26, 51–71, 80–82, 185–186, 194–199, 208–209.

*Primary Examiner*—Mark H. Rinehart
*Attorney, Agent, or Firm*—Michael J. McGowan; Robert W. Gauthier; Prithvi C. Lall

[57] ABSTRACT

An improved SCSI controller provides a logical connection between a plurality of host processors using a single SCSI initiator. The controller contains removable host adapters for connection to any type of host processor interface. When a host processor requests status information of a target device, that status information is passed to the requesting processor and subsequently stored in the controller and made available to all other host processors. The advantage to such a controller is the expanded number of host processor connections to a single SCSI initiator whereby each host processor can independently and logically connect through the controller and SCSI initiator to a target without clearing target status information for other host processors. The invention is particularly advantageous when adapted to function in a local area network (LAN) arrangement where a significant number of host processors are requesting data from one mass storage device.

10 Claims, 4 Drawing Sheets

SCSI CONTROLLER WITH TARGET STATUS RETRIEVAL

CROSS-REFERENCE TO RELATED PATENT APPLICATIONS

This patent application is co-pending with five related patent applications entitled Non-intrusive SCSI Status Sensing System U.S. patent application Ser. No. 08/219,553, Network File Server with Automatic Sensing Means U.S. patent application Ser. No. 08/219,556, Method of Non-intrusively Sensing Status in a Computer Peripheral U.S. patent application Ser. No. 08/219,557, Method of Retrieving and Storing Computer Peripheral Data U.S. patent application Ser. No. 08/219,554, and Method of Sensing Target Status in a Local Area Network U.S. patent application Ser. No. 08/219,555 by the same inventors as this application.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to a controller for interfacing a plurality of processors through a single Small Computer System Interface (SCSI) initiator disposed within the controller to a plurality of SCSI peripheral devices. More particularly, the controller described in the present invention provides a logical connection between a plurality of processors, herein referred to as host processors, and a single SCSI initiator located within the controller. When connected to the controller, the plurality of host processors can independently communicate with a plurality of SCSI peripherals or, as defined in the American National Standards Institute (ANSI) SCSI specification, target devices through the single SCSI initiator via industry standard or user defined interfaces, protocols, and commands. Target status information is cleared from the target's memory when the initiator requests status. In the present invention this target status information is stored by the controller for every host processor. The prior art system of integrating one initiator within a controller to a plurality of SCSI target devices is replaced with a new and improved system that expands the current protocol arrangement between one SCSI initiator and a plurality of SCSI targets and removes the need to add initiators as the number of host processors increases.

(2) Description of the Prior Art

Many types of peripheral devices can be interfaced to digital computers. For example, mass storage devices are used by computers to store and retrieve information. These devices utilize different types of media such as magnetic tape, magnetic disk, optical disk, or semiconductor memory. Each type of peripheral requires a unique, or device specific, interface. The American National Standards Institute has approved standard X3.131-1986, designated the Small Computer Systems Interface or SCSI-I, that allows a computer system to connect, through a device called an initiator, to a plurality of dissimilar peripheral devices, or SCSI targets, using high level device independent commands. The connection from the computer system to these targets is made through the SCSI initiator. The initiator sends commands to targets as defined in the ANSI standard, and the targets respond to these commands. ANSI standard X3.131-1986 permits one initiator to communicate with up to seven physical devices or targets in a time shared arrangement. More than one initiator can be used. However, the total number of initiators and targets cannot exceed eight. Target status conditions are reported to the requesting initiator and subsequently to the requesting processor which communicates with the initiator. In the prior art, once a target's status has been reported from the target through the initiator to the processor, that status information, normally stored in the target's controller, is cleared. If another processor were to connect to the same initiator and request status information on the same target, that information would not be available. Thus, the prior art system of using one initiator for multiple processors is disadvantageous in that if one processor receives and subsequently clears all target status information, other processors connected to that initiator are unaware of any changes that may have been made in the target's status. The only system available, prior to the present invention that would retain status information and make it available to a second host processor is to add a second initiator, connect the second processor to the second initiator, and connect the second initiator to the SCSI bus. Since the total number of targets and initiators is limited, adding another initiator decreases the total number of targets that the system can handle.

SUMMARY OF THE INVENTION

Accordingly, it is a general purpose and object of the present invention to provide an improved controller for interfacing a plurality of host processors to a plurality of SCSI target devices. A more specific object is to maintain the status condition for every SCSI target connected to a controller and provide that status to any requesting host processor connected to the controller and to obtain this object using only one SCSI initiator.

These objects are accomplished with the present invention by providing a system operating in the following manner. When a host processor issues a command to the controller and the controller receives a CHECK CONDITION status from a target, the controller will automatically interrogate the status of the requested target device and store that status for all host processors. When target status is requested and sent to a host processor, the controller clears its memory of that status corresponding to that host processor and that target. Each processor can request and subsequently receive target status information independently of the other using only one initiator. If additional host processors are added, the number of SCSI initiators does not have to be changed; the inventive system enables a single SCSI initiator to be used.

The controller, described in the present invention, is typically a personal computer (PC), a workstation, or any type of embedded controller comprised of removable host adapters that provide the interface to the host processors. The host processors can be connected to the controller in any of a plurality of interface and protocol arrangements.

BRIEF DESCRIPTION OF THE DRAWINGS

For a more complete understanding of the present invention and the advantages thereof, reference is now made to the following description of the preferred embodiment taken in conjunction with the accompanying drawings in which.

DESCRIPTION OF THE PREFERRED EMBODIMENT

Figure 1:
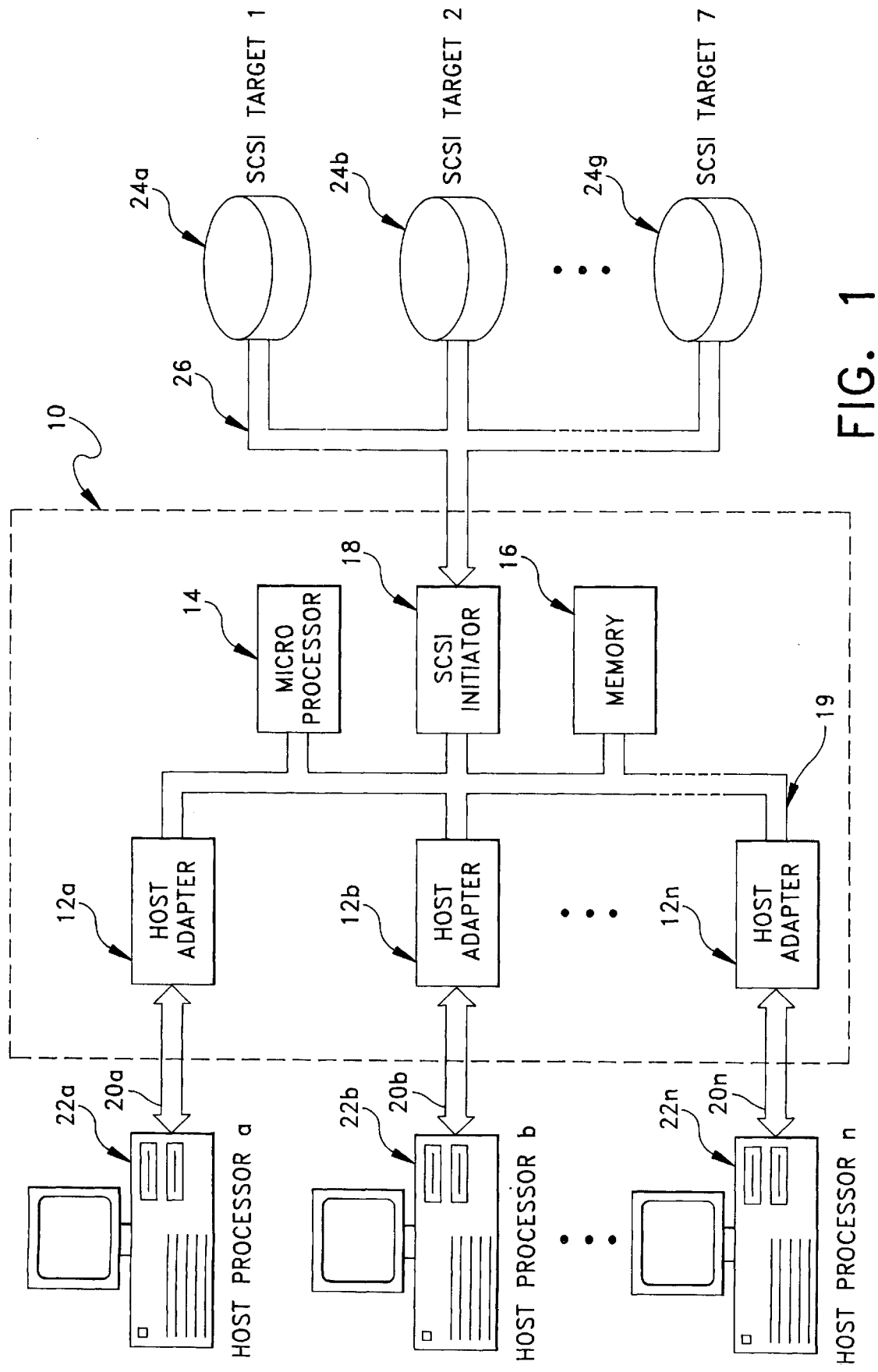
FIG. 1 is a block diagram of an SCSI controller connected to external host processors and SCSI target devices in accordance with the present invention.

Refer now to the drawing of FIG. 1 for a general description of the operation of the system and the components required to carry out its operation. A more detailed description is given later on with reference to the remaining figures. In all figures, identical components within the system carry identical numerals and letters. However, if a component in one figure is represented in other figures by various components, then different markings are used to denote each component not shown in the one figure.

FIG. 1 shows an SCSI controller 10 comprised of a plurality of host adapters 12a–n, a microprocessor 14, memory 16, and an SCSI initiator 18. All of these elements are electrically and logically connected using internal bus 19. Input/output interface means 20a–n connect respective host adapters 12a–n to respective host processors 22a–n. SCSI targets 24a–g connect to the SCSI initiator 18 of controller 10 by means of SCSI bus 26.

Host adapters 12a–n can be any integrated circuit or printed circuit card used for interfacing input/output devices to a computer. If, for example, host processor 22a is using an industry standard RS-232 serial protocol, then host adapter 12a would be a Universal Asynchronous Receiver Transmitter (UART) such as the Motorola 6850. Typically, if controller 10 includes a commercially available personal computer, then host adapter 12a would be a serial input/output printed circuit card. In another example, host processor 22b uses a parallel input/output protocol and host adapter 12b is a standard peripheral interface adapter (PIA) such as Motorola 6820. Again this could be a parallel input/output printed circuit card if controller 10 is arranged as a personal computer. If host processors 12a–n are connected to a local area network (LAN), then only one host adapter 12a is necessary and would function as a LAN controller such as an Ethernet or Fiber Distributed Data Interface (FDDI) controller. It is obvious to one of skill in the art the selection of the type and manufacturer of UART, peripheral interface adapter, or network controller that can be used. Other types of host processor interfaces and protocols can also be accommodated, provided the signal levels, protocol, and timing sequences are defined.

Microprocessor 14 is any commercially available microprocessor or microcontroller utilizing 8, 16, 32, or any other number of bits for a data path. In a typical embodiment, microprocessor 14 is a standard microprocessor used with personal computers such as the INTEL 80386 or 80486. Typically, controller 10 is a commercially available personal computer (PC) with expansion slots for accommodating external devices. The personal computer uses an industry standard operating system, such as DOS, and executes industry standard network management and file server software.

SCSI initiator 18 is an off-the-shelf commercially available integrated circuit (IC) such as the Fujitsu MB7030 or an SCSI printed circuit card. SCSI initiator cards typically are purchased with interface software so that the card, once inserted into a personal computer, can operate without the operator having to develop any unique software. This is typically the case when the personal computer is configured as a file server in a local area network (LAN) topology that services a plurality of host processors.

Figure 2:
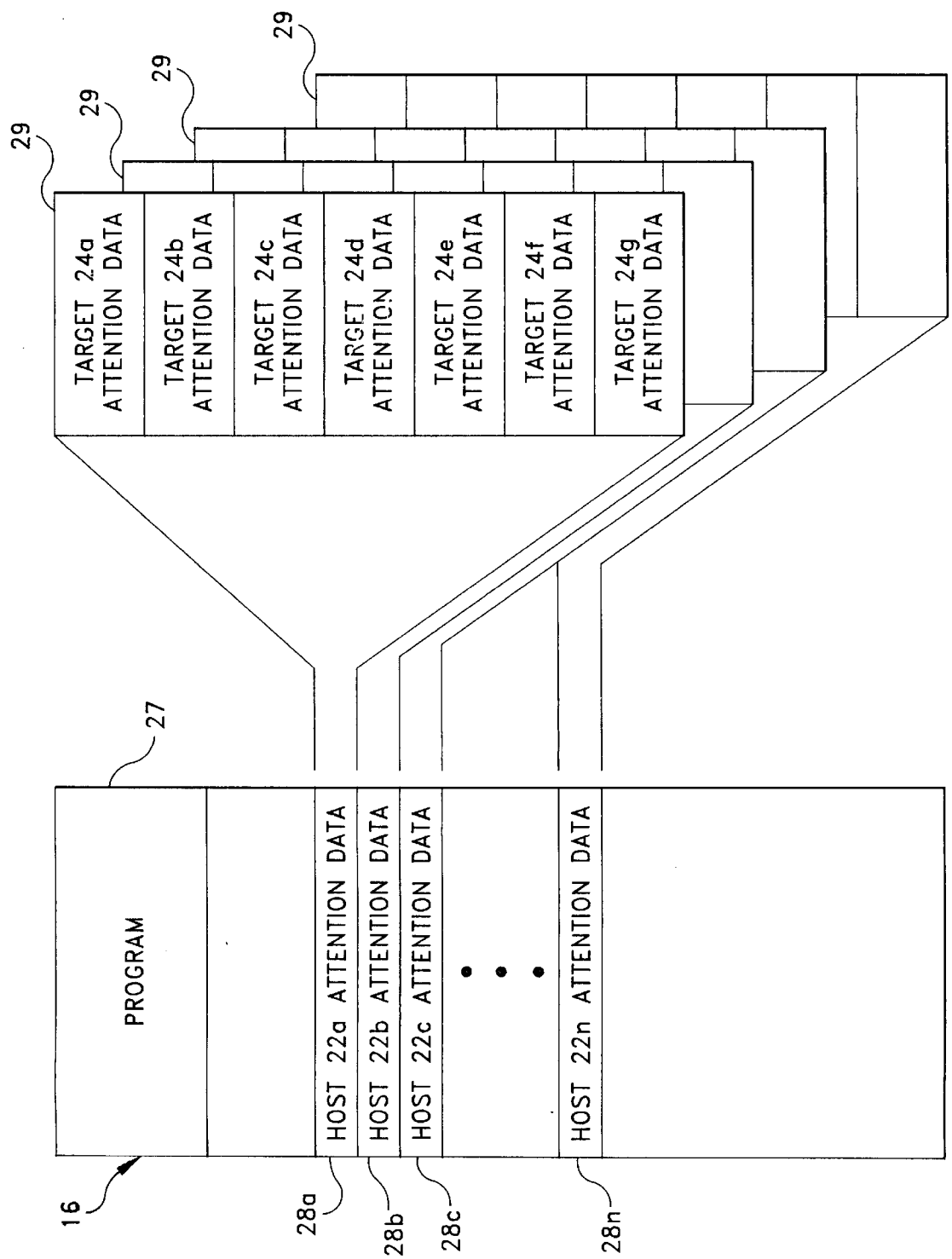
FIG. 2 is a block diagram showing the arrangement of the memory within the controller of FIG. 1.
Figure 3A:
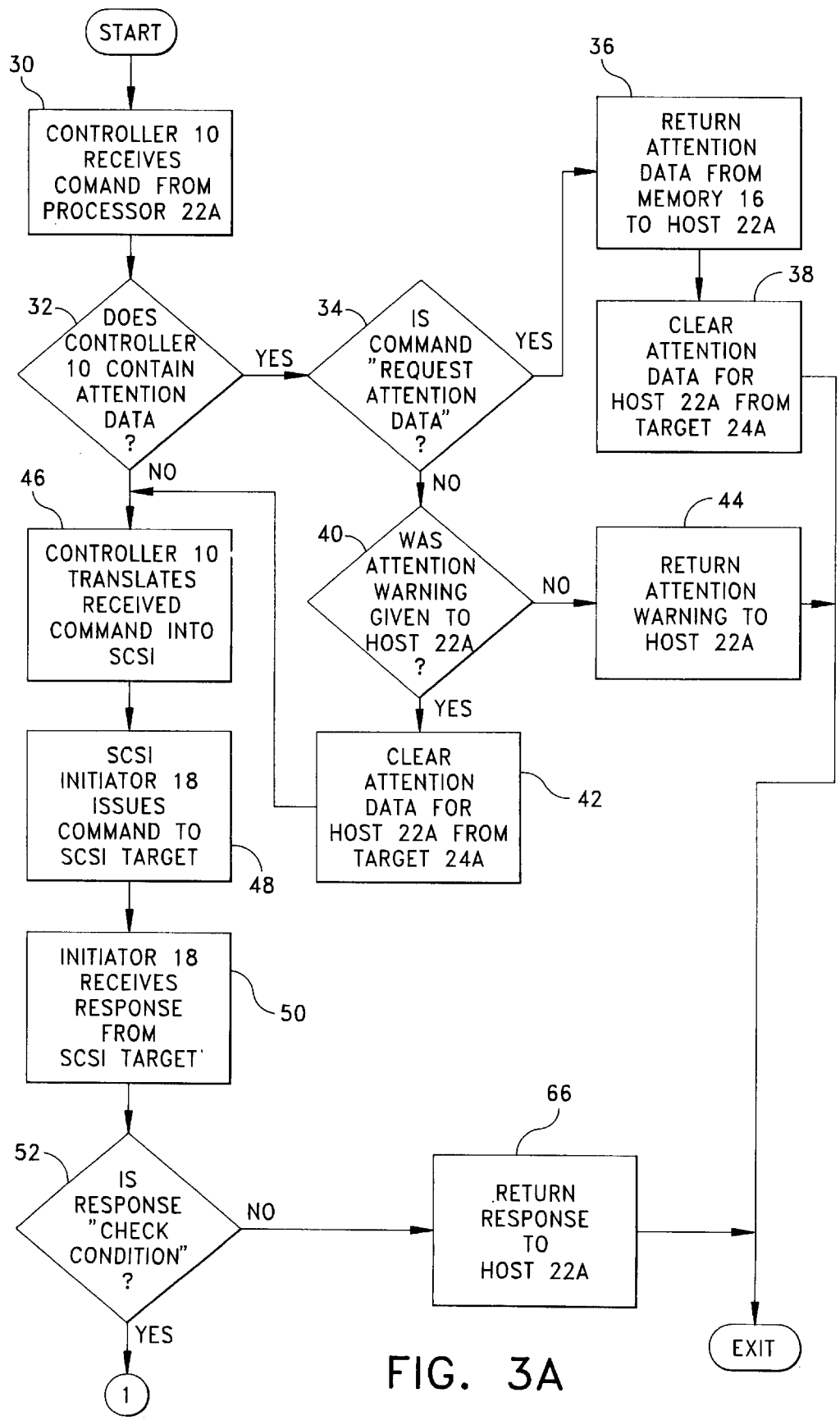
FIGS. 3A and 3B together comprise a flow chart depicting the operation of the controller of FIG. 1 when one of the host processors issues a command to the controller.
Figure 3B:
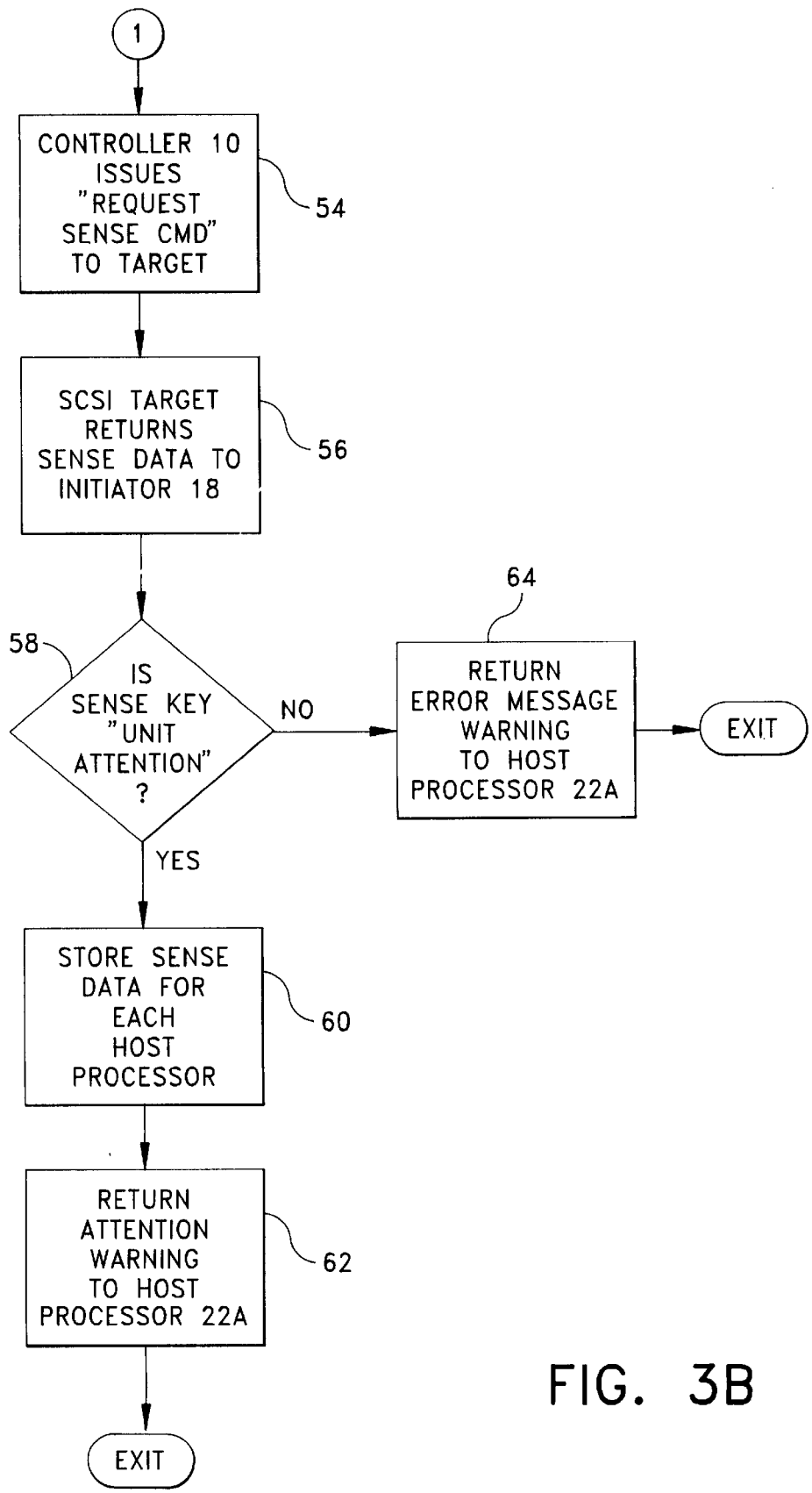

Memory 16, as best shown in FIG. 2, represents a combination of static and dynamic Random Access Memory (RAM) and Read Only Memory (ROM) widely available to the public. The flow chart shown in FIGS. 3A and 3B is an operational sequence that can be either down loaded externally from an SCSI target and executed from RAM or permanently stored in ROM and executed from ROM or RAM. In any case, memory 16 represents the function that stores the program 27 and microprocessor 14 (FIG. 1) represents the function that executes the program 27.

FIG. 2 also shows that for each host processor 22a–n of FIG. 1 there is the storage of ATTENTION DATA for each target 24a–g of FIG. 1. The addresses for each host processor are shown as 28a–n. The information for each address is identical and is shown as 29.

Refer again to FIG. 1. The normal operation of the various components within controller 10 is well documented by the prior art. Personal computers, workstations, and embedded controllers are widely used by the public and the various operational sequences that control their internal components are executed by commercially available software packages. The specific embodiment herein describes how a personal computer, workstation, or embedded controller can be adapted to function as an interface to a plurality of host processors logically connected to one SCSI initiator with up to seven SCSI target devices. The flow chart shown in FIGS. 3A and 3B is an operational sequence that controller 10 executes when any of the host processors 22a–n issues a command through controller 10 to any of the SCSI targets 24a–g.

Before the flow chart in FIGS. 3A and 3B is described, a brief description of an SCSI UNIT ATTENTION condition is given. SCSI is an intelligent protocol whereby bus sequences and target/initiator conditions are monitored. There are a number of conditions designated as UNIT ATTENTION. It will be described using target 24a although it is to be understood it is the same for all targets 24a–g. These UNIT ATTENTION conditions exist when the controller 10 of an SCSI target 24a is reset, power to a target 24a is cycled from OFF to ON or from ON to OFF to ON, or media has been removed and replaced within the controller of target 24a. The last situation is typical of optical disks that can be removed from a disk controller without having to cycle power OFF and ON. Whenever one of these conditions occurs, if the SCSI initiator 18 sends a command to the SCSI target 24a, the controller of the target 24a responds with a CHECK CONDITION status. This status informs the requesting initiator 18 that a condition exists with the target 24a that may be of interest to the initiator 18. The initiator 18, at this point, can ignore the CHECK CONDITION status and reissue the command. Since the situation is a UNIT ATTENTION condition, the CHECK CONDITION is cleared and the target 24a processes the reissued command in the normal fashion. If the initiator 18 does not want to ignore the CHECK CONDITION status, it can issue an SCSI REQUEST SENSE command to the target. The internal controller of the target 24a then responds with SENSE DATA. This SENSE DATA contains a key that indicates whether the CHECK CONDITION status originally returned to the initiator 18 was due to a UNIT ATTENTION condition or some other condition. The embodiment described herein is concerned with CHECK CONDITION status due to UNIT ATTENTION.

Refer again to FIG. 1 for a description of the operational sequence that transpires when an SCSI target device is in a UNIT ATTENTION condition. Host processor 22a, interface 20a, host adapter 12a, and SCSI target 24a are referenced in the following sequence. However, the sequence is applicable to all processors 22a–n, interfaces 20a–n, host adapters 12a–n, and targets 24a–g shown in FIG. 1.

Host processor 22a issues a command over interface 20a to host adapter 12a. Microprocessor 14, sensing either by polling host adapter 12a or receiving an interrupt signal from host adapter 12a, reads that command from host adapter 12a. Microprocessor 14 verifies that host processor 22a sent a valid command and passes this command to SCSI initiator 18. SCSI initiator 18 selects the designated SCSI target 24a, using the selection protocol defined by the ANSI SCSI standard. Once the target 24a is selected, the command is passed to it.

SCSI target 24a, having received a command from SCSI initiator 18 is in a UNIT ATTENTION condition and responds to SCSI initiator 18 with a CHECK CONDITION status. This status is read and recognized by microprocessor 14. Microprocessor 14 then automatically issues an SCSI REQUEST SENSE command to SCSI initiator 18 that in turn issues the command to SCSI target 24a. SCSI target 24a contains an embedded SCSI controller characteristic of peripheral devices with an SCSI interface. The controller, disposed within SCSI target 24a, contains the SENSE DATA that describes the nature of the CHECK CONDITION status.

Initiator 18 then receives the SENSE DATA from SCSI target 24a. Microprocessor 14 reads this SENSE DATA and checks a unique bit field designated the sense key. This bit field consists of four bits. If the bit pattern is a six hexadecimal, it indicates that a UNIT ATTENTION condition has occurred. If the bit pattern is something other than six, then a fault or failure may exist within SCSI target 24a.

Controller 10, having detected a UNIT ATTENTION condition at SCSI target 24a, stores this SENSE DATA for all host processors 22a–n connected to controller 10. Controller 10 maintains SENSE DATA of all SCSI targets 24a–g and for all host processors 22a–n. SENSE DATA received from SCSI targets 24a–g is stored in memory 16, in respective locations 28a–n, and is normally referred to as ATTENTION DATA in this disclosure.

Refer now additionally to FIGS. 3A and 3B. At task box 30 a command is received from host processor 22a for selected SCSI target 24a. The controller 10 at decision box 32 checks its memory 16 to see if ATTENTION DATA is present at the appropriate address. This ATTENTION DATA would be present at the above appropriate address in memory 16 if a previous command received from one or more of host processors 22a–n for SCSI target 24a resulted in a CHECK CONDITION status and the ATTENTION DATA had not been cleared. If memory 16 within controller 10, at the appropriate address, does contain ATTENTION DATA, controller 10 determines if the received command is a REQUEST ATTENTION DATA command at decision box 34. If it is, then at task box 36 controller 10 returns the ATTENTION DATA from memory 16 to host processor 22a using microprocessor 14. Once the ATTENTION DATA has been returned to the requesting host processor 22a, controller 10 clears the ATTENTION DATA at the appropriate address in memory 16 for the requesting host processor 22a at task box 38. No other memory locations containing ATTENTION DATA within memory 16 are cleared by the action at task box 38.

If controller 10 does contain ATTENTION DATA at decision box 32, but the command received from host processor 22a is not REQUEST ATTENTION DATA at decision box 34, then controller 10 determines, at decision box 40, whether an ATTENTION WARNING was given to host processor 22a. The ATTENTION WARNING is a warning message sent from controller 10 to requesting host processor 22a indicating that controller 10 contains ATTENTION DATA in memory 16 at the address receiving ATTENTION DATA from SCSI target 24a for host processor 22a. If the warning was previously given and the command is not REQUEST ATTENTION DATA, then at task box 42 controller 10 clears the ATTENTION DATA at the address in memory 16 receiving ATTENTION DATA from SCSI target 24a for host processor 22a. If the ATTENTION WARNING was not provided to the requesting host processor 22a, then at task box 44 the warning is sent from controller 10 to the host processor 22a. At this point in the sequence, the host processor 22a can reissue the original command or send a REQUEST ATTENTION DATA command. If the reissued command is not REQUEST ATTENTION DATA, then all ATTENTION DATA stored in memory 16 is cleared at the address for that host processor 22a concerning the selected SCSI target 24a. The sequence is through boxes 30, 32, 34, 40, and 42. If the reissued command is REQUEST ATTENTION DATA, then the ATTENTION DATA is sent to the requesting host processor 22a and the ATTENTION DATA stored in the address at memory 16 for that host processor 22a and SCSI target 24a is cleared. The sequence is through boxes 30, 32, 34, 36, and 38.

When controller 10 receives a command from host processor at task box 30 and does not contain ATTENTION DATA at decision box 32, or the above sequence through boxes 30, 32, 34, 40, and 42 has taken place, controller 10 translates the received command into an SCSI command at task box 46 and sends it to SCSI initiator 18. SCSI initiator 18 interprets the SCSI command and selects the SCSI target 24a specified in the received command. SCSI initiator 18 then issues this command, at task box 48, to the selected SCSI target 24a and subsequently receives a response from the target 24a at task box 50. If at decision box 52 the response is a CHECK CONDITION, then controller 10 issues an SCSI REQUEST SENSE command to the selected SCSI target 24a at task box 54. The SENSE DATA is received by the initiator 18 from the SCSI target 24a at task box 56 and is read by controller 10 at decision box 58 to determine if the sense key is a six hexadecimal. If it is, then the received SENSE DATA is stored in memory 16 for every host processor 22a–n connected to controller 10 at task box 60 and an ATTENTION WARNING is sent to host processor 22a at task box 62 to complete the program. If the sense key is not a six hexadecimal, then an error message is sent to host processor 22a, at task box 64, to complete the program. This indicates that the SENSE DATA received from the SCSI target 24a is not UNIT ATTENTION DATA. The SENSE DATA received from SCSI target 24a in this case is not stored in memory 16.

Decision box 52 can also render a response that is not a CHECK CONDITION. In such a case, the response is returned to host processor 22a at task box 66.

There has therefore been described a microprocessor 14 based controller 10 for use with SCSI peripherals 24a–g that upon detecting an SCSI CHECK CONDITION status from a selected SCSI target such as 24a automatically issues a REQUEST SENSE COMMAND to the selected SCSI target 24a. The SENSE DATA received from the SCSI target 24a is checked to determine if a UNIT ATTENTION condition exists. If it does, then the received SENSE DATA is stored for all host processors 22a–n connected to the controller 10.

The REQUEST SENSE COMMAND, in accordance with the SCSI protocol, clears all SENSE DATA in the selected SCSI target 24a after that data is sent to controller 10. This clearing of SENSE DATA, in prior art devices, meant that the SENSE DATA was only available for one of the host processors 22a–n. The invention described herein removes that limitation by storing the SENSE DATA for all host processors 22a–n in memory 16 whenever a UNIT ATTENTION condition exists.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system including a small computer system interface comprising:
    a plurality of host processors;
    a controller connected to each of said plurality of host processors, said controller including an interconnection of only one SCSI initiator, at least one host adapter, a microprocessor and a memory;
    a plurality of SCSI targets with each of said plurality of SCSI targets connected to said controller;
    said each of said host processors having issuing and receiving means for issuing separate commands to designated SCSI targets through said controller and for receiving information in response to said commands from said designated SCSI targets through said controller;
    said controller further having first processing means for processing said separate commands from each of said host processors to said designated members of said SCSI targets, and second processing means for processing said information from said designated members of said SCSI targets to said each of said plurality of host processors;
    each of said designated members of said SCSI targets having generating means for generating said information in response to said commands, said information signifying if a UNIT ATTENTION condition exists; and
    said controller further having first storage means for storing said information as ATTENTION DATA from each of said plurality of SCSI targets for each of said plurality of host processors, when said UNIT ATTENTION condition exists, said first storage means further having a separate memory location for each combination of said SCSI targets and said host processors.

2. A system including a small computer system interface according to claim 1 wherein said controller further comprises:
    said at least one host adapter connected to said host processors, said at least one host adapter having operating means for receiving said separate commands from said host processors and for transmitting said information to said host processors; and
    said SCSI initiator connected to said plurality of SCSI targets, said SCSI initiator having operating means for transmitting said commands to designated SCSI targets and for receiving said information from said designated SCSI targets.

3. A system including a small computer system interface according to claim 2 wherein said memory further comprises said first storage means.

4. A system including a small computer system interface according to claim 3 wherein said controller further comprises:
    attention warning means for indicating if ATTENTION DATA exists upon receiving a command initiated at one of said host processors for one of said SCSI targets, upon indication that attention data exists said attention warning means further comprises first determining means for determining if said command requests said ATTENTION DATA; and
    first returning means for having said ATTENTION DATA transmitted to said one of said host processors and first clearing means for then clearing said ATTENTION DATA for said one of said host processors and said one of said SCSI targets from said first storage means upon said first determining means being affirmative.

5. A system including a small computer system interface according to claim 4 wherein said attention warning means further comprises:
    second determining means for determining if attention warning was previously transmitted to said one of said host processors; and
    second returning means for returning said attention warning to said one of said host processors when attention warning was not given.

6. A system including a small computer system interface according to claim 5 wherein said controller further comprises second clearing means for clearing said attention data for said one of said host processors and said one of said SCSI targets from said first storage means when said attention warning was previously given to said one of said host processors.

7. A system including a small computer system interface according to claim 6 wherein said controller further comprises;
    translating and second operating means for translating and transmitting said command to said initiator within said controller, said initiator issuing said command to said one of said SCSI targets and receiving a response from said one of said SCSI targets when one of: (a) said controller does not contain ATTENTION DATA and (b) attention warning was given to said one of said host processors and ATTENTION DATA was cleared from said controller is present;
    third determining means for determining if said response from said one of said one of said SCSI targets is a CHECK CONDITION; and
    third returning means for returning said response to said one of said host processors when said response is not a CHECK CONDITION.

8. A system including a small computer system interface according to claim 7 wherein said controller further comprises:
    third operating means for issuing REQUEST SENSE command to said one of said targets and receiving sense data upon said response being a CHECK CONDITION;
    fourth determining means for determining if sense key on sense data received from said one of said SCSI targets is UNIT ATTENTION;
    second storage means for storing sense data for each of said host processors if said sense key is UNIT ATTENTION; and
    fourth returning means for returning attention warning to said one of said host processors upon said sense key being UNIT ATTENTION.

9. A system including a small computer system interface according to claim 8 wherein said controller further comprises fifth returning means for returning an error message to said one of said host processors when said sense key is not UNIT ATTENTION.

10. A system including a small computer system interface according to claim 9 wherein said controller further comprises being in the form of a personal computer.

* * * * *